United States Patent [19]

Cobble et al.

[11] 4,270,844
[45] Jun. 2, 1981

[54] OMNI-DIRECTIONAL COMPOUND PARABOLOID-HYPERBOLOID RADIATION DEVICE

[76] Inventors: Milan H. Cobble, 2019 Crescent Dr.;
Wendell C. Hull, 1860 Myrtle St.;
Richard A. Hays, 3006 Devondale,
all of Las Cruces, N. Mex. 88001

[21] Appl. No.: 83,046

[22] Filed: Oct. 9, 1979

[51] Int. Cl.³ .......................... G02B 5/10; G02B 17/06
[52] U.S. Cl. .................................................... 350/294
[58] Field of Search ............... 350/294, 293, 296, 292, 350/289, 55; 126/438, 439, 451, 441, 424, 425

[56] References Cited

U.S. PATENT DOCUMENTS

| | | | |
|---|---|---|---|
| 3,988,166 | 10/1976 | Beam | 126/439 |
| 4,131,485 | 12/1978 | Meinel et al. | 350/294 |

FOREIGN PATENT DOCUMENTS

| | | | |
|---|---|---|---|
| 394232 | 4/1924 | Fed. Rep. of Germany | 126/439 |
| 2407436 | 5/1979 | France | 350/294 |

OTHER PUBLICATIONS

Hannan, Peter W., "Microwave...", *IRE Transactions on Antennas and Propagation*, pp. 140-151, Mar. 1961.

*Primary Examiner*—Jon W. Henry
*Attorney, Agent, or Firm*—Nathan Edelberg; Robert P. Gibson; Saul Elbaum

[57] ABSTRACT

The invention is a device which receives radiation from a point source, from the sun, or from other means, said radiation being received on the surface of a mirrored paraboloid of revolution which is tracking the point source, though the source may be stationary, and reflects the radiation to the mirrored surface of a confocal hyperboloid of revolution whose shape is dependent on the distance to the desired second focus. The hyperboloid reflects radiation of high intensity to the second focus, where the flux is intensified, using a conical mirrored surface or a compound parabolic concentrator, to a flux intensity approaching the surface flux intensity of the sun. The radiation input to the device may also be from an array of point or distributed sources, such as from an array of lasers.

10 Claims, 3 Drawing Figures

OMNI-DIRECTIONAL COMPOUND PARABOLOID-HYPERBOLOID RADIATION DEVICE

BACKGROUND AND SUMMARY OF THE INVENTION

Rights of the government: The invention described herein may be manufactured, used, and licensed by or for the United States Government for governmental purposes without the payment to us of any royalty thereon.

The invention relates to astronomy, cassegrain telescopes, solar furnaces, solar concentrators, and solar power towers, and in particular to high energy flux devices. Specifically, the invention relates to high energy flux devices reflecting radiation of high intensity to a second focus.

The prior state of the art consists of mirrored concentrating paraboloids of revolution, solar furnaces, such as those represented by: the French furnace at Montlouis, France; the United States Army furnace at White Sands, New Mexico; the Tohoka University solar furnace at Sandai, Japan; the CNRS 1000 KW solar furnace at Odeillo, France; and the power tower concept being developed at Sandia Laboratories in Albuquerque, New Mexico.

The present invention is arranged to transport high energy flux, concentrated radiant energy, from a source such as the sun, to an arbitray point of convenience from a fixed point where the apparatus, the paraboloid and hyperboloid, is stationed.

At the receiving point, the second focus, the transported flux may be used in its delivered form or further concentrated to a very high flux for possible power production, high temperature excavation, testing of materials at high temperatures, or research where high flux is necessary.

In the aforementioned arrangement, the receiving point, the second focus, can be placed at a convenient site which is in contrast to the fixed receiving point of present solar concentrators.

In a variation of the radiation device, the combination of a paraboloid of revolution primary with an ellipsoid of revolution secondary and confocal in a Gregarian combination that would also be able to transmit high energy flux for relatively long distances to a convenient second focus not necessarily located on the axis of symetry of the primary.

It is, therefore, an object of the invention to provide a radiation device to transport high energy flux.

It is another object of the invention to provide a radiation device to transport the high energy flux from a source to an arbitrary point of convenience.

It is also an object of the invention to provide a radiation device to transport the high energy flux from a fixed point where the apparatus is stationed.

It is still another object of the invention to provide a radiation device having a paraboloid and hyperboloid apparatus.

It is yet another object of the invention to provide a radiation device where the transported flux may be used at the receiving point, the second focus, in its delivered form.

It is also still another object of the invention to provide a radiation device where the transported flux at the second focus may be further concentrated to a very high flux for various uses.

It is also yet another object of the invention to provide a radiation device where the receiving point, the second focus, can be placed at a convenient site.

Further objects and advantages of the invention will become more apparent in the light of the following description of the preferred embodiments.

DESCRIPTION OF THE PREFERRED EMBODIMENTS

Figure 2:
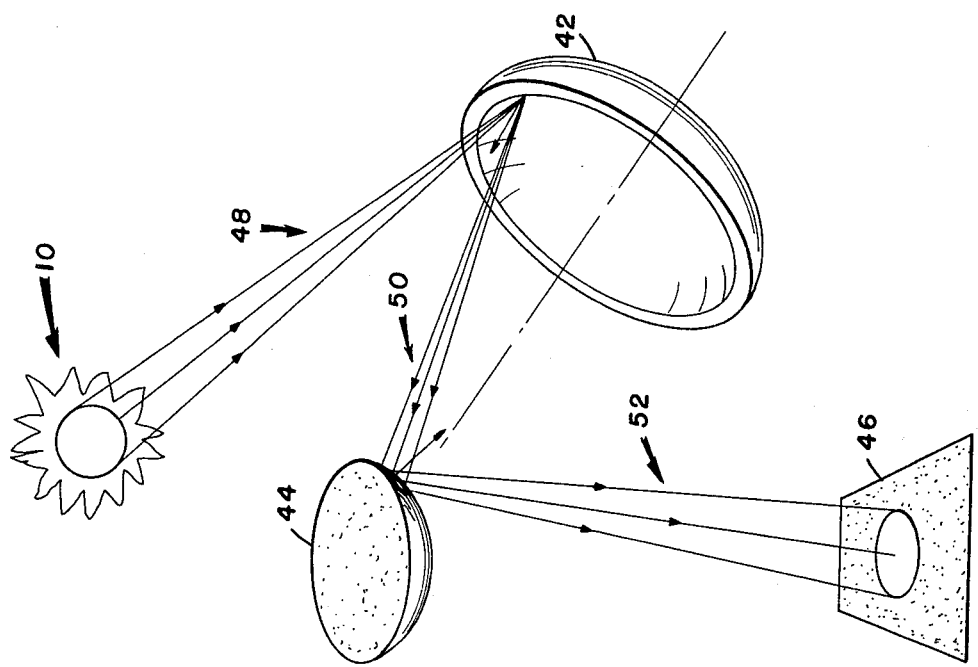
FIG. 2 is a diagramatical representation of an omni-directional compound paraboloid-hyperboloid radiation device and radiation paths without a conical or compound parabolic concentrator at the second focus.

Referring to the drawings, an omni-directional compound paraboloid-hyperboloid radiation device is shown at 5.

The omni-directional compound paraboloid-hyperboloid radiation device 5 consists of a tracking paraboloid 20 connected to and mounted on a support pedestal 18, a redirecting hyperboloid 14 suitably mounted above said tracking paraboloid 20, and an associated conical or compound parabolic concentrator 26 which has special associated functions as hereinafter described.

A point or distributed source of radiation, such as the sun 10, emits radiation in a plurality of directions. A certain amount of the emitted radiation is directed naturally toward the tracking paraboloid 20. The directional path of the latter reference emitted radiation is indicated in FIG. 1 by the directional lines 36 which lead from the source, the sun 10, to the tracking paraboloid 20.

The tracking paraboloid 20 tracks the path of the moving point source of radiation, the sun 10, so that the interior reflective surface 22 of the tracking paraboloid 20 is always oriented on center toward the source of radiation, the sun 10.

It is to be noted that the source of radiation may be a source other than the sun 10 and it may also be a stationary source of radiation that does not need to be tracked. It is also to be noted that the radiation input to the paraboloid 20 of the device 5 may also be from an array of points or distributed sources, such as from an array of lasers. There aforementioned variations of the source of radiation are within the scope and intent of this invention.

Figure 1:
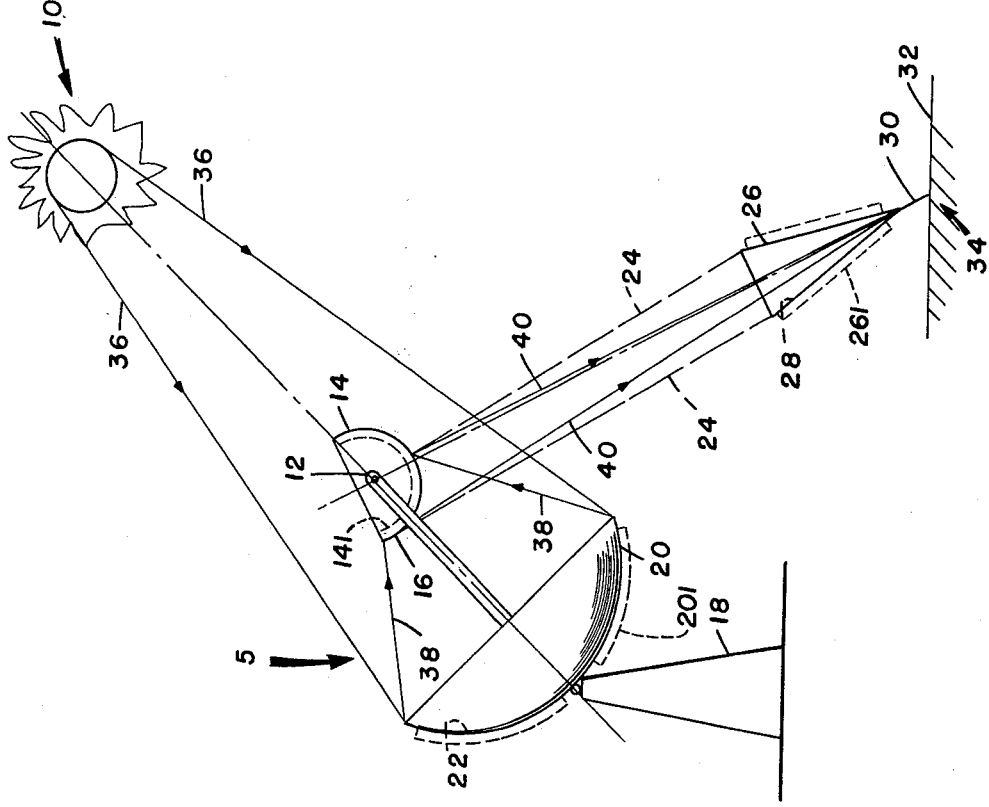
FIG. 1 is a perspective view of an omni-directional compound paraboloid-hyperboloid radiation device with diagramatic representation of radiation paths, including a conical or compound parabolic concentrator.
Figure 3:
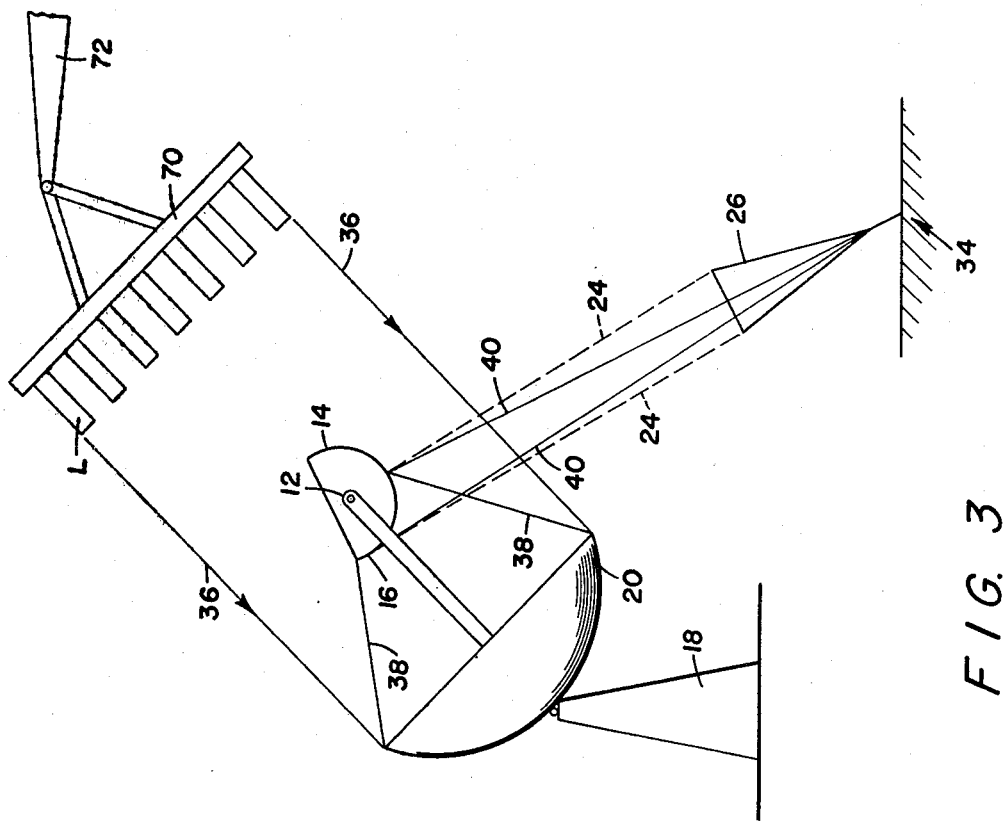
FIG. 3 is a perspective view of an alternate embodiment of the apparatus shown in FIG. 1, including an array of artificial sources of radiation.

FIG. 3 illustrates an alternate embodiment of the apparatus shown in FIG. 1, like components being similarly numbered. Rather than utilizing the sun as a radiation source, the embodiment of FIG. 3 comprises an array 70 of laser devices L. The array is maintained in a chosen position by means of a support 72 of any suitable configuration. Radiation from the array of laser devices is directed to the reflective elements of the apparatus in the manner described with reference to FIG. 1. As is evident, use of the array of lasers obviates the need for a natural source of radiation. The array 70 need not be positioned as indicated in FIG. 3, but may be supported at any position convenient to the user of the apparatus of the present invention.

The radiation received at the reflective surface 22 is reflected by the paraboloid 20 configuration to the concentration redirecting hyperboloid 14. The directional path of the aforementioned reflected radiation is indicated in FIG. 1 by the directional lines 38.

Because the reflected radiation reaching the redirecting hyperboloid 14 will increase the temperature at the surface of the hyperboloid 14, a fluid cooling system illustrated schematically at 141 cools the reflective surface 16. Paraboloid 20 may be cooled by means illustrated schematically at 201.

The radiation paths from the point source 10 to the reflecting surface 22, and from the reflective surface 22 to the redirecting hyperboloid 14 have a common focus 12.

Reflected radiation reaching the reflective surface 16 of the redirecting hyperboloid 14 are further reflected in a direction toward a receiving point or target 32. The target 32 may be any high temperature work area as hereinbefore described. The reflection of the radiation from the hyperboloid 14 is concentrated along the directional lines 40 with a spreading of the concentrated image along the lines 24.

The normal pattern of the reflected radiation will be described in conjunction with the reference hereinafter to FIG. 2. FIG. 1 illustrates a reflected hyperboloid focus 34. A highly concentrated solar energy 30 results from the addition of a conical or compound parabolic concentrator 26. The reflected radiation from the hyperboloid 14 is directed to the conical concentrator 26 where the internal reflective surface 28 results in an intensified highly concentrated solar energy 30 at the target or high temperature work area 32. Because the temperature at the reflective surface 28 will increase tremendously, the the reflective surface 28 is fluid cooled by means illustrated schematically at 261.

It is to be noted that the use of the conical or compound parabolic concentrator 26 is optional and is used when a highly concentrated delivery of solar energy 30 is needed. The general delivery of solar energy, that is, not highly concentrated, will be described in conjunction with the description of FIG. 2.

The reflection of radiation without the use of a conical or compound parabolic concentrator 26 is shown in FIG. 2. The concentration of the random emission of radiation from a source 10 is illustrated in FIG. 2 by the concentration of emitted radiation on a single point on the internal surface of a tracking paraboloid 42. The directional path of the aforementioned radiation is shown by the directional lines 48 from the source 10 to the tracking paraboloid 42.

The reflection of the radiation from the source on the internal surface of paraboloid 42 is along the directional lines 50 to the external surface of redirecting hyperboloid 44.

At the external surface of the redirecting hyperboloid 44, the radiation is further reflected, the reflection is along the directional lines 52 to the target surface 46. As illustrated the radiation, without the previously described conical concentrator, falls in a general pattern on the target surface 46.

Thus, the omni-directional compound paraboloid-hyperboloid radiation device 5 receives radiation, from a source 10, on the internal surface of a mirrored paraboloid of revolution, the tracking paraboloid 20 (or 42), which is tracking the source 10, the internal reflective surface 22 of the tracking paraboloid 20 (or 42) reflects the radiation to the mirrored surface 16 of the confocal hyperboloid of revolution, the redirecting hyperboloid 14. The hyperboloid 14 or 44 reflects radiation of high intensity to the second focus at target 32 or 46. If not further intensified the radiation pattern is as illustrated in FIG. 2.

If the radiation is intensified by the use of a conical or compound parabolic mirrored surface 28, the radiation is intensified to a flux intensity approaching the surface flux intensity of the sun.

As can be readily understood from the foregoing description of the invention, the present structure can be configured in different modes.

Accordingly, modifications and variations to which the invention is susceptible may be practiced without departing from the scope of the appended claims.

We wish it to be understood that we do not desire to be limited to the exact details of construction shown and described, for obvious modifications can be made by a person skilled in the art.

What is claimed is:

1. An omni-directional compound paraboloid-hyperboloid radiation device, comprising:
   a paraboloid having an internal reflecting surface for tracking a source of radiation; and
   a hyperboloid having an external reflecting surface, said hyperboloid being movably mounted with respect to said paraboloid reflecting surface for redirecting the radiation reflected from said internal reflecting surface of said paraboloid to a location remote from said paraboloid and concentrating the reflected radiation at said remote location.

2. The radiation device as recited in claim 1, and additionally, a concentrator having an internal reflective surface, suitably mounted at the focus of the reflected radiation from said external surface of said hyperboloid.

3. The radiation device as recited in claim 1, and means for mounting said paraboloid for tracking a source of radiation.

4. The radiation device as recited in claim 1, and additionally means for cooling the reflective surface of said hyperboloid.

5. The radiation device as recited in claim 2, and means for cooling the internal reflective surface of said concentrator.

6. The radiation device as recited in claim 1, wherein said paraboloid and said hyperboloid have a common focus.

7. The radiation device as recited in claim 1, wherein said source of radiation is an array of sources of radiation.

8. The radiation device as recited in claim 7, wherein said array of sources of radiation is an array of lasers.

9. The radiation device as recited in claim 2, and additionally, means for cooling the reflective surfaces of said paraboloid hyperboloid, and said concentrator.

10. The radiation device as recited in claim 9, and means for mounting said paraboloid for tracking a source of radiation.

* * * * *